United States Patent [19]

Rabinovich et al.

[11] Patent Number: 5,844,709

[45] Date of Patent: Dec. 1, 1998

[54] MULTIPLE QUANTUM WELL ELECTRICALLY/OPTICALLY ADDRESSED SPATIAL LIGHT MODULATOR

[75] Inventors: William S. Rabinovich, Silver Springs; Steven R. Bowman, Davidsonville, both of Md.; Guy Beadie, Alexandria, Va.

[73] Assignee: The United States of America as represented by the Secretary of the Navy, Washington, D.C.

[21] Appl. No.: 940,738

[22] Filed: Sep. 30, 1997

[51] Int. Cl.⁶ .................................. G02F 1/03; G06K 9/76
[52] U.S. Cl. ............................................. 359/248; 382/211
[58] Field of Search ............................. 359/248; 382/211; 257/21

[56] References Cited

U.S. PATENT DOCUMENTS

| | | |
|---|---|---|
| 5,040,140 | 8/1991 | Horner . |
| 5,086,483 | 2/1992 | Capps . |
| 5,119,443 | 6/1992 | Javidi et al. . |
| 5,151,822 | 9/1992 | Hekker et al. . |
| 5,412,499 | 5/1995 | Chiu et al. ................................. 359/248 |
| 5,528,702 | 6/1996 | Mitsuoka et al. . |
| 5,600,485 | 2/1997 | Iwaki et al. . |
| 5,637,883 | 6/1997 | Bowman et al. . |

OTHER PUBLICATIONS

C.L. Adler et al., Dynamic White Light Holography Using and Optically Addressed Multiple Quantum Well Spatial Light Modulator, Optical Communications, vol. 114, p. 375 (Feb. 15, 1995).

S.R. Bowman et al., High–Resolution Spatial Light Modulators Using GaAs/AlGaAs Quantum Wells, Applied Physics Letters, vol. 65, p. 956 (No. 8, Aug. 22, 1994).

W.S. Rabinovich et al., Intrinsic Multiple Quantum Well Spatial Light Modulators, Applied Physics Letters, vol. 66, p. 1044 (No. 9, Feb. 27, 1995).

A. Partovi et al., Cr–Doped GaAs/AlGaAs Semi–Insulating Multiple Quantum Well Photorefractive Devices, Applied Physics Letters, vol. 62, p. 464 (No. 5, Feb. 1, 1983).

*Primary Examiner*—Georgia Epps
*Assistant Examiner*—John Woolner
*Attorney, Agent, or Firm*—Thomas E. McDonnell; Alan P. Klein; Edward F. Miles

[57] ABSTRACT

A multiple quantum well spatial light modulator combines both optically addressed and electrically addressed portions on a single wafer. The electrically and optically addressed portions may be physically distinct or combined. To fabricate the modulator, a portion of an optically addressed multiple quantum well spatial light modulator is configured as an electrically addressed portion by pixellating that portion of the multiple quantum well wafer. The frequency of the applied voltage to the electrically addressed portion is increased such that the voltage switches faster than both the dark and illuminated screening time. The electrically and optically addressed portions may be combined or positioned side-by-side. The spatial light modulator has applications in a wide variety of low-cost, high performance pattern recognition systems. In one system, a first infrared beam impinges the electrically addressed portion of the modulator and picks up the pattern electrically written thereon (i.e., the template image). A second infrared beam impinges the optically addressed portion of the modulator and picks up the pattern written thereon by a white light writing beam (i.e., sample image). The first and second infrared beams then pass through a lens, where the beams are Fourier transformed in the plane of an optically addressed spatial light modulator (OASLM). The correlation hologram formed on the OASLM is read out by a third infrared beam and detected using a photodiode array. In a second system, the lens and OASLM are replaced with a parabolic reflector which reflects the first and second infrared beams onto the optically addressed portion of the modulator.

34 Claims, 2 Drawing Sheets

MULTIPLE QUANTUM WELL ELECTRICALLY/OPTICALLY ADDRESSED SPATIAL LIGHT MODULATOR

FIELD OF THE INVENTION

The present invention relates to spatial light modulators and more particularly to multiple quantum well electrically/optically addressed spatial light modulators for use in high speed pattern recognition applications.

BACKGROUND OF THE INVENTION

High speed pattern recognition has potential use in many diverse fields. Representative applications include security applications such as face and fingerprint recognition, machine vision applications including robot navigation and factory automation, and information processing tasks such as character recognition, image retrieval from databases and, potentially, high speed database searches of gene sequences.

While many digital computer-based pattern recognition techniques have been developed, all are limited by the inherent computational speed of the host processor. Pattern recognition algorithms for two dimensional data such as images depend upon mathematical transforms of the input data. The most notable and commonly used mathematical transform is the Fourier transform. Unfortunately, mathematical transforms are computationally expensive. Even with optimized algorithms like the fast Fourier transform, the calculation time for many pattern recognition algorithms is prohibitively long.

For about three decades, optical pattern recognition (OPR) has been an alternative to digital pattern recognition. OPR uses optical elements such as lenses and spatial light modulators (SLMs) to compare image data. The advantageous features of OPR include: 1) OPR is automatically parallel, dealing with an entire image at once; 2) depending on the system architecture, OPR may have a computation time that is independent of the size of the image; and 3) the lenses in OPR devices generate the Fourier transform of an image placed in its focal plane. Thus, by using OPR, the most expensive operation in many pattern recognition operations is performed essentially in the transmission time of light over small distances.

In a typical OPR configuration, two images, an input and a reference or template to which the input is compared, are imposed upon a coherent beam of light. This beam is then passed through a lens and focused on an optically addressed spatial light modulator (OASLM). An OASLM can be thought of as a piece of photographic film that can be continuously written on and erased. The beam forms a hologram on the OASLM which is then read out with a reference beam and passed through another lens. The operation performed is a convolution of the template and input images. If the images are similar a bright diffraction order is produced from the read out, or reference, beam. If the images are dissimilar, no diffraction spot is produced.

An OPR device has three functional units: the beam forming unit in which the input and reference or template images are placed onto the coherent writing beam; the correlation unit which includes an OASLM for mixing the Fourier transforms of the input and reference images; and the output or detection unit in which the results of the correlation are measured. The speed of the OPR device can be limited by the operational restrictions present in any one of these units.

Generally, the output unit places no limitation on the speed of OPR devices, as a high speed photodiode array capable of speeds up to 100 KHz is typically used to measure the correlation.

Historically, the correlation unit has limited the speed of OPR devices. Until recently, the fastest OASLMs were constructed using materials, such as ferroelectric liquid crystals, typically having top speeds of 10 KHz. The speed limitation was directly attributable to the inefficient switching times of the materials. This limitation has recently been overcome by the development of optically addressed multiple quantum well spatial light modulators as described in U.S. Pat. No. 5,637,883. These modulators operate at speeds up to 1 MHz using modest amounts of light produced by commercially available laser diodes.

An optically addressed multiple quantum well spatial light modulator (MQW OASLM) is described in U.S. Pat. No. 5,637,883, which is incorporated herein by reference. The MQW OASLM has an unpixellated capacitive-like structure in which a multiple quantum well layer of a few microns thickness is sandwiched between two transparent electrodes, which may be doped semiconductor layers. Separating the electrodes from the multiple quantum well region are trap laden regions of AlGaAs and possibly a dielectric layer.

In operation a modest (~10 v) ac voltage is applied to the MQW OASLM. The voltage alters the absorption of the multiple quantum well region near the band gap of the material. The voltage is imposed between the electrodes at a rate that is faster than the dark screening time of the multiple quantum well region, but slower than the screening time when the device is exposed to light. As a result, any light pattern incident on the device is mimicked by the internal electric field. That is, the illuminated regions screen the applied field while the dark regions do not. The trapping layers prevent photocarriers from moving laterally and leaking from illuminated regions into unilluminated regions. Thus, the band edge absorption differs in the illuminated and unilluminated regions. If the device is exposed to a writing light beam having a wavelength shorter than the band gap, a read out beam having a wavelength near the band gap sees an absorption pattern that matches the internal electric field pattern and hence the writing light pattern. Thus, the device acts as an OASLM. While the read out beam must be narrow line and near the band gap, the writing beam may be broad band. In fact, incoherent white light can be used to write patterns on these devices. Thus, the device may act as an incoherent to coherent light converter.

The MQW OASLM as described in U.S. Pat. No. 5,637,883 has shown very high resolution (~5 $\mu$m) and high sensitivity to light. It is clear that speeds on the order of 1 MHz are possible.

Existing OPR devices are severely limited by the operational restraints imposed by the beam forming unit. The beam forming unit combines an input of the image to be correlated with an optical memory system that brings up reference images for comparison with the input image. Currently, some of the fastest beam forming devices have been electrically addressed spatial light modulators (EASLM) using ferroelectric liquid crystal. EASLMs change their transmissions when a voltage is applied to a pixellated electrode and are generally connected to computer memory or a video camera. A typical EASLM has 256×256 pixels and operates at 10 KHz. The speed of an EASLM is limited by two rates: 1) the physical switching speed of the material; and 2) the data transfer rate from the camera or computer memory to the electronics which switches the voltages on the pixels on and off. In a 256×256 ferroelectric liquid crystal EASLM these two rates are balanced. That is, even if the device has fewer pixels, which reduces the data transfer load, the switching speed of the material does not allow the device to operate more quickly.

The above discussion suggests that the maximum rate of an OPR device is currently 10 KHz, limited by the beam forming unit. Needs exist for OPR devices that are capable of operating at higher speeds.

In many applications, beam forming of the input image is not a rate limiting step. In those applications the input image is typically compared against many possible reference images. Thus, while the reference images must be rapidly changed, the input image remains constant. In addition, the input image often needs no beam forming at all, such as when the input image is an actual image that is input into the correlator. Examples of such applications include a character recognition system in which a page is optically imaged with a lamp and lens, or a machine vision system for a factory robot. In these applications, the only "beam forming" necessary is the conversion of the incoherent white light image to coherent form. As described above, MQW OASLMs can perform this operation very quickly.

In most applications, formation of the reference image is the real rate limiting step. Using ferroelectric liquid crystal EASLMs, reference images cannot be formed at rates exceeding 10 KHz. When the reference image is quite complex, requiring an EASLM of size 256×256 pixels or more, the correlation speed is limited to 10 KHz due to data transfer limitations. However, there are many applications in which the input image contains a great deal of information while the reference image contains much less. For example, in character recognition, the input image may be a whole page or line, requiring hundreds or thousands of pixels to describe, while the reference image is a single character requiring perhaps a 10×10 grid to describe. Thus, the data transfer requirements for the reference image are often small. In fact, for many applications the reference image data is typically transferrable from computer memory to the EASLM in less than 1 microsecond. However, if the underlying material for the EASLM is a ferroelectric liquid crystal, the device remains limited to the 10 KHz switching rates. On the other hand, an electrically addressed MQW SLM has a maximum switching rate near 1 GHz. Accordingly, it would be desirable, in applications where the data transfer requirements are small, to provide a multiple quantum well based system that could beam form both the input image (via incoherent to coherent conversion) and the template image using electrical addressing at speeds up to 1 MHz.

An additional consideration with joint transform correlators is that the relative angle between the beam carrying the template image and the beam carrying the input image is critical to the performance of the device. Since most SLMs operate in reflective mode, it would be highly desirable to provide for an OPR device having the SLM forming the input beam and the SLM forming the template on the same substrate.

An additional limitation realized by existing optical correlators is a lack of algorithmic flexibility. That is, while a computer can be programmed with an optimized algorithm for a problem, optics is limited to those operations, such as the Fourier transform, which are easily performed with light, lenses and SLMs. In particular, conventional OASLMs can only perform the multiplication of two Fourier transforms. Accordingly, it would be desirable to provide an OASLM that allows selective enhancement of some portions of the Fourier plane.

SUMMARY OF THE INVENTION

The present invention is a multiple quantum well spatial light modulator that combines both optically addressed and electrically addressed portions on a single wafer. The electrically and optically addressed portions may be physically indistinct or positioned side-by-side or otherwise arranged. To fabricate the modulator, a portion of an optically addressed multiple quantum well spatial light modulator, as described in U.S. Pat. No. 5,637,883, is pixellated, thereby providing for a multilayer heterostructure having both electrically addressed and optically addressed portions. The frequency of the applied voltage to the electrically addressed portion is increased such that the applied field switches faster than both the dark and illuminated screening times of that portion of the structure. The high switching speed of the multiple quantum well material in the spatial light modulator provides for effective operation at speeds up to 1 MHz, even when the number of pixels on the electrically addressed portion is small (i.e., <1000). The present invention has applications in a wide variety of low-cost, high performance pattern recognition systems.

The electrically and optically addressed spatial light modulator uses multiple quantum wells to perform several functions related to high speed pattern recognition via optical correlation, including incoherent to coherent conversion, template beam forming and holographic mixing. The modulator, by combining both electrically and optically addressed modulators onto a single wafer, avoids misalignment problems and provides for pattern recognition systems having increased speeds, greater stability, lower cost and algorithmic flexibility.

The spatial light modulator includes a modulating unit having at least one electrically addressed portion and at least one optically addressed portion. The electrically and optically addressed portions of the modulating unit each have a photodiffracting semiconductor multilayer structure, including a plurality of alternating quantum wells and barrier layers, a top conductive layer that is at least partially transparent, and a bottom conductive layer. The top and bottom conductive layers sandwich the semiconductor multilayer structure. At least one cladding layer is sandwiched between the semiconductor multilayer structure and the top conductive layer, the bottom conductive layer, or both. The electrically addressable portion of the modulating unit further includes a matrix of pixels provided therein. An alternating current voltage source is provided for generating an electric potential between the top conductive layer and the bottom conductive layer, thereby producing an electric field within the semiconductor multilayer structure. During operation, the applied field for the electrically addressed portion of the modulating unit switches faster than both the dark and illuminated screening times of the quantum wells. In the optically addressed portion, the field is applied slower than the screening time of the illuminated sections.

The electrically and optically addressed portions of the modulating unit are provided on a single substrate, and are either positioned side-by-side, with isolating means provided there between, or combined such that the electrically and optically addressed portions are indistinct. In an exemplary embodiment where the differing addressed portions are combined, the top and bottom conductive layers include multiple concentric rings of varying sizes, with each of the rings being isolated from adjacent rings. That configuration provides for sophisticated data processing, including image edge enhancement and dynamic image cropping.

The present invention may operate as either a transmissive or a reflective device. When operating as a reflective device, at least one of the conductive layers is grown in the form of a distributed Bragg reflector. The conductive layers, which are doped contact layers, may have the form of an n-i-n device or a p-i-n device.

Numerous architectures for a joint transform correlator using the new spatial light modulator for optical pattern recognition are possible. Each joint transform correlator apparatus includes a first spatial light modulator having an electrically addressed portion for recording a first image and an optically addressed portion for recording a second image. The applied fields for the electrically addressed portions are switched at a rate faster than the dark and illuminated screening times. The applied fields for the optically addressed portions are switched at a rate slower than the illuminated screening time of the optically addressed portions. A reference or template image is recorded on the electrically addressed portion of the modulator by addressing the individual pixels using well-known techniques. An input image is provided on the optically addressed portion of the modulator, which has broad band sensitivity to light, by directing a writing beam carrying the input image thereon. The input and reference images are converted to coherent input and reference images, respectively, and are read out by directing first and second infrared beams onto the electrically and optically addressed portions of the modulator. Correlation holograms of the coherent images are produced by passing the first and second beams carrying the images through a lens. A recording means records the correlation hologram. The recording means may be a second modulator. The second modulator may be an optically addressed or optically and electrically addressed spatial light modulator. The correlation hologram is read out by a light beam. The resulting correlation beam carrying the correlation image is detected using a fast photodiode array and processed to create a correlation for the entered input and reference images.

In a second, simpler embodiment, the lens of the correlator is replaced by a parabolic reflector and the second modulator is eliminated. The first and second beams carrying the first and second coherent images, respectively, are directed onto the parabolic reflector, which, in turn, Fourier transforms the images and directs beams carrying the Fourier transforms back towards the optically addressed portions of the modulator. In this embodiment, the optically addressed portions of the modulator function as both the input image recording means and as the correlation hologram recording means.

With the foregoing and other objects, advantages and features of the invention that will become hereinafter apparent, the nature of the invention may be more clearly understood by reference to the following detailed description of the invention, the appended claims and to the several views illustrated in the attached drawings.

DETAILED DESCRIPTION OF THE INVENTION

Figure 1:
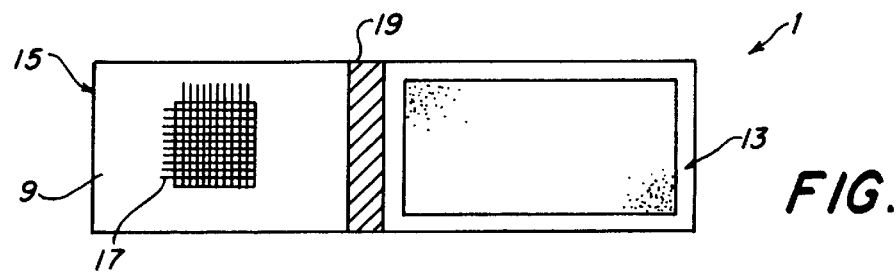
FIG. 1 is a front view of the electronically addressed/optically addressed spatial light modulator of the present invention.
Figure 2:
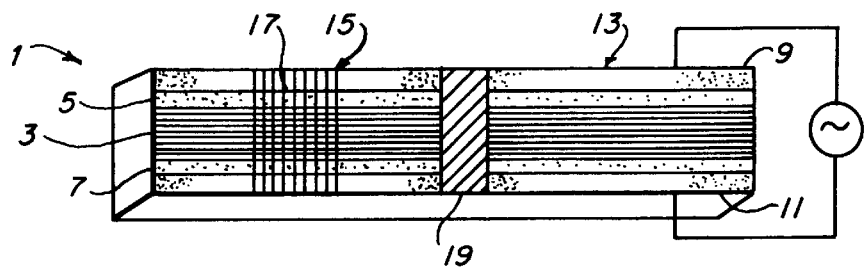
FIG. 2 is a top view of the modulator of FIG. 1.

Referring now in detail to the drawings wherein like parts are designated by like reference numerals throughout, FIGS. 1 and 2 provide schematic views of the electrically and optically addressed spatial light modulator 1 of the present invention. The configuration and make-up of the modulator 1 is similar to that disclosed in U.S. Pat. No. 5,637,883, the disclosure of which is incorporated herein by reference. The modulator 1 includes a photodiffracting intrinsic semiconductor multilayer heterostructure 3 sandwiched between cladding layers 5 and 7. The multilayer heterostructure 3 has a sufficiently high bandgap to prevent or minimize the thermal generation of charge carriers and includes a superlattice of alternating multiple quantum well layers and barrier layers. Typical multilayer heterostructures 3 acceptable for use in the present modulator 1 include, but are not limited to, the following alternating multiple quantum well/barrier layer combinations: GaAs/AlGaAs, InGaAs/AlGaAs, GaSb/AlGaSb, and GaN/AlGaN. Modulators 1 having InGaAs/AlGaAs multilayer heterostructures operate deep into infrared regions and provide for transmissive modulation. When GaN-based heterostructures are incorporated, visible, as opposed to infrared, light may be used as the readout beam.

The cladding layers 5 and 7 which sandwich the multilayer heterostructure 3 have sufficiently high concentrations of traps for trapping the photocarriers and restricting lateral movement thereof. Suitable materials for the cladding layers 5 and 7 include, but are not limited to, low temperature grown GaAs, low temperature grown AlGaAs, and hydrogenated alpha silicon.

To provide an electric field across and perpendicular to the multilayer heterostructure 3, the cladding layers 5 and 7 are sandwiched between a top conductive layer 9 and a bottom conductive layer 11. At least one of the conductive layers 9 and 11 is at least partially transparent to light. The conductive layers 9 and 11 are preferably doped contact layers and may be of the n-i-n or p-i-n type. Means for generating an electric field between the conductive layers 9 and 11, such as an alternating current voltage source, is also provided.

The modulator 1 has separate optically addressed portions 13 and electrically addressed portions 15. Each optically addressed portion 13 is as described above and operates in the manner described in U.S. Pat. No. 5,637,883. Each electrically addressed portion 15 of the modulator 1 is formed by providing a grid of pixels 17 thereon. The pixels 17 are regularly arranged as a lattice or matrix and are drivable using existing addressing means. The pixels 17 are formed on the electrically addressable portions 15 of the modulator 1 using any acceptable technique, such as ion bombardment.

FIGS. 1 and 2 show an embodiment of the modulator 1 having a single electrically addressable portion 15 and a single optically addressed portion 13, with the two portions being arranged in a side-by-side relationship. It should be understood that the number of electrically and optically addressed portions comprising a single modulator is limitless. Electrically and optically addressed portions should, however, be operationally isolated from each other by a barrier means 19. Existing techniques, including ion bombardment, may be used for effecting that isolation while still providing for a single unitary structure.

Figure 3:
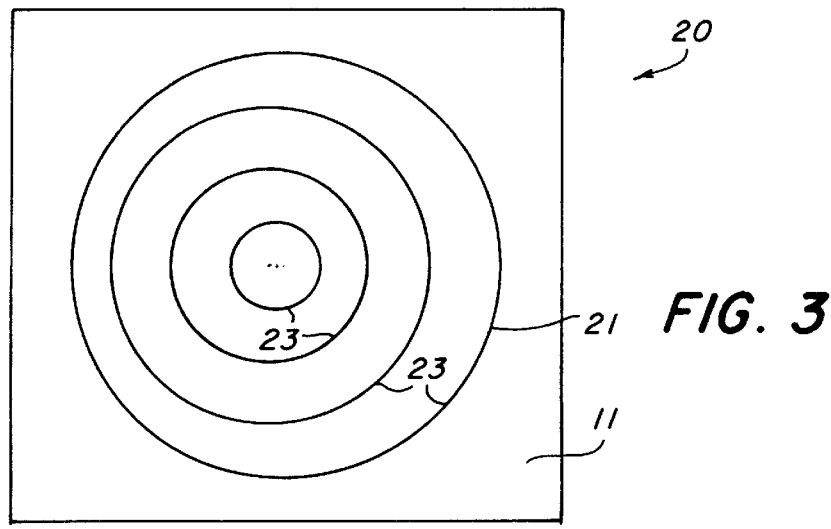
FIG. 3 is a front view of an alternate embodiment of an electronically addressed/optically addressed spatial light modulator of the present invention having combined electronically addressed and optically addressed portions.

FIG. 3 illustrates a spatial light modulator 20 wherein the electrically addressed and optically addressed portions are combined, or physically indistinct. A circular or other acceptable electrode pattern 21 is provided as the top and bottom conductive layers 9 and 11. The electrode pattern 21 includes multiple concentric bands 23 of various sizes. Each band 23, which may be a circular ring, is electrically isolated from adjacent bands 23. Modulators 20 having combined electrically and optically addressed portions and conductive layers constructed from distinct bands 23 are capable of reducing, or eliminating, the applied voltage to select portions of the modulator. This embodiment combines some aspects of both an electrically addressed and an optically addressed spatial light modulator. The applied field is varied faster than the dark screening time but slower than the illuminated screening time, just as in a multiple quantum well optically addressed spatial light modulator; however, delivery of the applied voltage to certain parts of the device may be reduced or eliminated.

The suitable thickness of each layer of the modulators 1 and 20 according to the present invention varies depending upon the materials used, the wavelengths to be modulated, and the desired effect The appropriate thickness for a particular application or configuration can be determined by mathematical computation and/or empirically.

The modulators 1 and 20 shown in FIGS. 1, 2 and 3 may be either transmissive or reflective. In reflective modulators, either a reflector layer is provided between the bottom cladding layer 7 and the bottom conductive layer 11, or the reflective layer is substituted for the bottom conductive layer 11. The reflector layer may be a metallic layer of sufficient thickness to completely reflect the light to be modulated. In embodiments where the reflective layer replaces the conductive layer, the reflective layer is grown as a distributed Bragg reflector selected to provide near complete reflection of the light to be modulated. While any Bragg reflector material may be used, a typical Bragg reflector layer includes alternating layers of AlGaAs/AlAs.

Both the electrically and optically addressed portions of the modulator 1 are provided on a single wafer and positioned on a single substrate. While the portions thereof may be isolated from each other, the modulator remains a single unitary structure. The bottom conductive layer is attached to the substrate by any suitable method, including but not limited to solid phase bonding, epoxy bonding, or by growth of the bottom conductive layer thereon. The substrate may be made of a transparent material, such as quartz or glass, to allow light to pass therethrough. By providing both the electrically and optically addressed portions of the modulator on a single wafer and positioning the grown structure on a single substrate, the orientation of each portion relative to the others remains constant.

To operate the modulator as an optically addressed device, a voltage is applied between top conductive layer 9 and bottom conductive layer 11. The voltage between the conductive layers 9 and 11 is alternated at a rate faster than the dark screening time but slower than the illuminated screening time of the multilayer heterostructure. When exposed to a write light beam having a wavelength near the band edge of the multiple quantum well material of the heterostructure 3, photocarriers are developed in the heterostructure 3. The photocarriers are then trapped in the cladding layers 5 and 7, where they screen the applied field in the illuminated regions. As a result, any light pattern incident on the optically addressed portion 13 is mimicked by the internal electric field.

To operate the modulator as an electrically addressed device, the voltage between the conductive layers 9 and 11 is alternated at a rate faster than both the illuminated and dark screening times of the multilayer heterostructure 3. To have the modulator function somewhere therebetween, the voltage flip time may be slightly extended.

The modulators described herein have application in high speed recognition systems. The present invention provides for a joint transform correlator having a modulating unit that includes both optically and electrically addressable portions on a single wafer. This eliminates misalignment problems and operational speed limitations associated with existing OPR devices and results in significant reduction in cost, size and complexity of the correlator.

Figure 4:
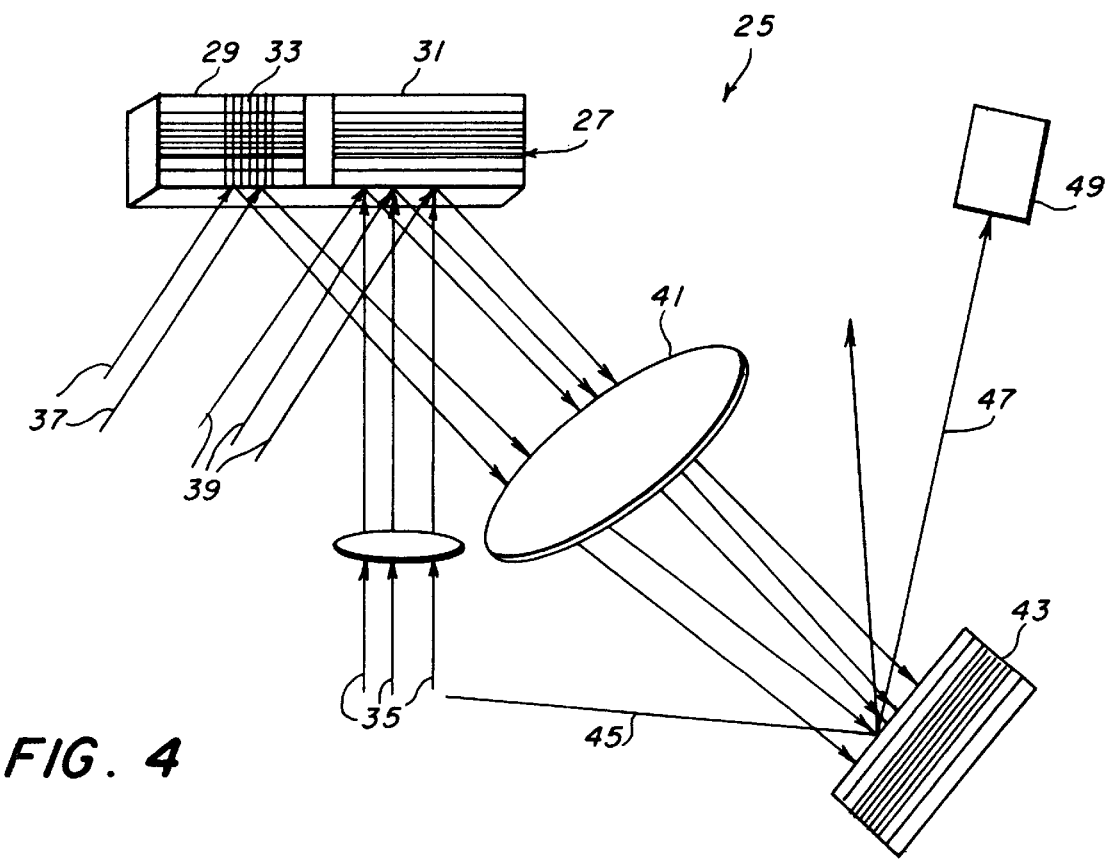
FIG. 4 is a schematic diagram of one embodiment of an optical pattern recognition system including the multiple quantum well electronically addressed/optically addressed spatial light modulator FIGS. 1 and 2 and an optically addressed spatial light modulator as a correlation hologram recording device.

Referring now to FIG. 4, the construction of one possible embodiment of a joint transform correlator 25 for pattern recognition is shown. The correlator 25 includes a spatial modulator 27, as described above, having an electrically addressed portion 29 for recording reference images and an optically addressed portion 31 for recording input images. It should be understood that, depending on the particular application, the placement of the reference and input images may be reversed, i.e, the input images may be recorded on the electrically addressed portion 29 and the reference images may be recorded on the optically addressed portion 31. A reference image is electronically stored by the pixels 33 of the electrically addressed portion 29 and may consist of standard images, such as letters or machine tools. An input image is recorded on the optically addressed portion 31 of the modulator 27 by directing thereon white light beams 35 carrying the requisite information, such as a printed page of text or a scene from a factory floor.

The optically addressed portion 31 of the modulator 27 has broad band sensitivity to light, which allows it to perform the function of incoherent to coherent conversion in producing the input image. By pixellating portions of the optically addressed portion 31 of the device, more sophisticated data processing such as edge enhancement may be performed.

Light sources direct infrared beams 37 and 39 onto the modulator. These beams initially have no patterning, but upon reflection from the device, acquire patterns. Specifically, first infrared beams 37 impinge the electrically addressed portion 29 of the modulator 27 and pick up the pattern electrically written thereon (i.e., the reference image). Second infrared beams 39 impinge the optically addressed portion 31 of the modulator 27 and pick up the pattern written thereon by the white light writing beam 35 (i.e., input image). The first and second infrared beams 37 and 39 then pass through a lens 41, where the beams 37 and 39 are Fourier transformed in the plane of a recorder 43, which in FIG. 4 is an optically addressed spatial light modulator having a configuration as described in U.S. Pat. No. 5,637,883. The correlation hologram formed on the recorder 43 is read out by infrared beam 45. The resulting correlation beam 47 carries a correlation image of the hologram. A photodiode array 49 detects the correlation beam 47, converts the correlation image to a correlation signal, and processes the correlation signal to obtain the correlation for the entered input and reference images.

Figure 5:
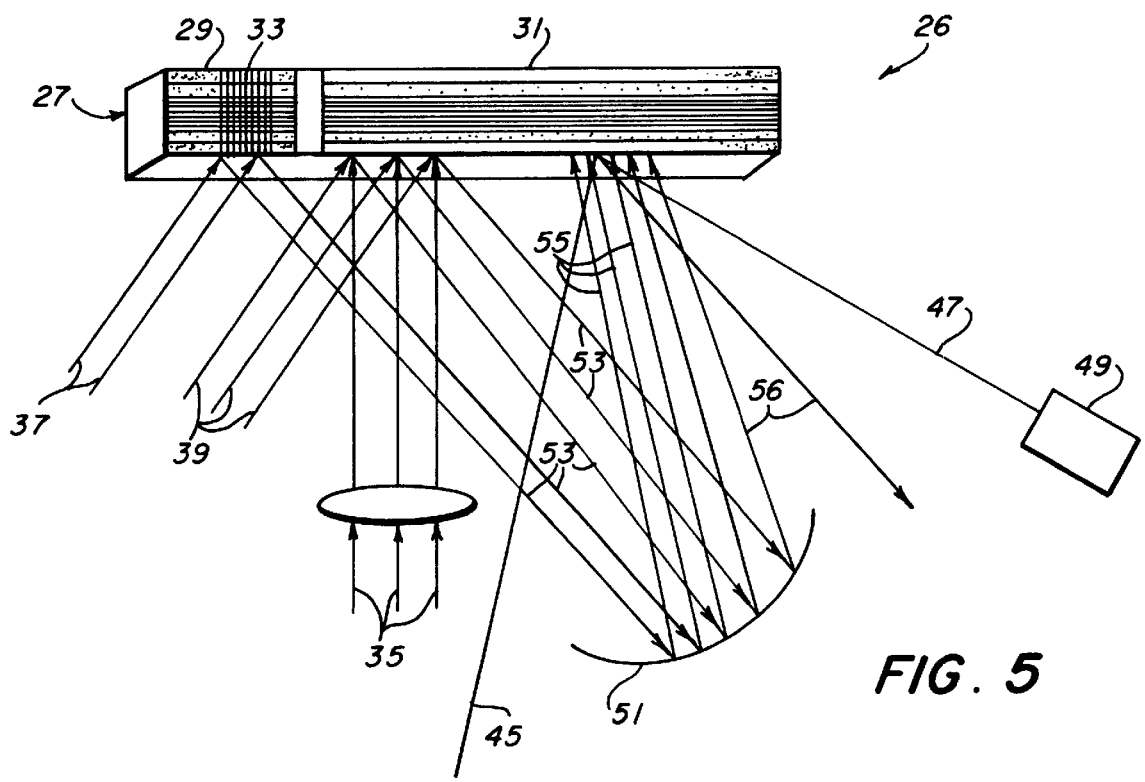
FIG. 5 is a schematic diagram of an alternate embodiment of an optical pattern recognition system including the multiple quantum well electronically addressed/optically addressed spatial light modulator of FIGS. 1 and 2 and a parabolic reflector.

FIG. 5 illustrates an alternate embodiment of adjoint transform correlator 26 having minimal components. Elements common to the correlators 25 and 26 shown in FIGS. 4 and 5 are designated by like reference numerals. In the embodiment shown in FIG. 5, the lens 41 and recorder 43 of the correlator 25 illustrated in FIG. 4 are eliminated and replaced with a parabolic reflector 51. In addition, the optically addressed portion 31 of the modulator 27 serves as the input image formation means and as the holographic mixer in the Fourier plane, further reducing the component count and cost. In use, the first and second infrared beams 37 and 39, which carry the reference and input images, respectively, are reflected from the surface of the modulator 27 and strike the parabolic reflector 51. The input and reference beams 53 reflect off parabolic reflector 51, which serves the same function as the lens in the embodiment shown in FIG. 4, i.e., producing Fourier transforms of the reference and input images. The reflected beams 55 impinge the optically addressed portion 31 of the modulator 27 and record a correlation hologram thereon. The hologram is then read out by beam 45, with correlation beam 47 being detected by a photodiode array 49 and its signal processed to generate a correlation of the entered input and reference images.

When selective enhancement or cropping of portions of the Fourier plane is desired, a composite electrically and optically addressed spatial light modulator, such as the modulator shown in FIG. 3, is included as part of the joint transform correlator 25, 26. For the embodiment of the correlator shown in FIG. 4, the recorder 43, i.e, an optical spatial light modulator, is replaced with the modulator shown in FIG. 3. Individual rings 23 of the modulator are selectively turned on or off, thereby effectively turning on or off those selected portions of the Fourier plane. For example, when only the outer rings have a field applied to them, the correlator is only sensitive to high spatial frequencies (which appear further from the center of the correlation plane), and the device, in essence, performs an edge enhancement.

The modulator shown in FIG. 3 may also be included as an optical preprocessor for the imaging system of the correlator shown in FIGS. 4 and 5. By replacing the physically distinct modulator 27 shown in FIGS. 4 and 5 with the combined modulator shown in FIG. 3, edge enhancement and cropping of the input image may be effected. By writing a hologram of the Fourier transform of an incoming image on the modulator and turning off the inner rings, the read out image becomes edge enhanced in a time far shorter than can be accomplished electronically. This hybrid pixellated modulator of FIG. 3 enables optical processing to have some of the algorithmic flexibility of computer processing, but at a much higher speed. Other pixellated optically addressed modulators could be used in incoherent and coherent conversion to dynamically crop parts of an incoming image.

Although certain presently preferred embodiments of the invention have been described herein, it will be apparent to those skilled in the art to which the invention pertains that variations and modifications of the described embodiment may be made without departing from the spirit and scope of the invention. Accordingly, it is intended that the invention be limited only to the extent required by the appended claims and the applicable rules of law.

What is claimed as new and desired to be secured by Letters Patent of the United States is:

1. A spatial light modulator comprising:
   a modulating unit having at least one electrically addressed portion and at least one optically addressed portion, said electrically addressed and optically addressed portions of said modulating unit each having a photodiffracting semiconductor multilayer structure, including a plurality of quantum wells;
   a top conductive layer that is at least partially transparent;
   a bottom conductive layer;
   said top conductive layer and said bottom conductive layer sandwiching said semiconductor multilayer structure;
   at least one cladding layer sandwiched between said semiconductor multilayer structure and said top conductive layer or said bottom conductive layer;
   said electrically addressed portion of said modulating unit having a matrix of pixels provided therein; and
   means for generating an electric potential between said top conductive layer and said bottom conductive layer, thereby producing an electric field within said semiconductor multilayer structure.

2. The spatial light modulator of claim 1, wherein said electrically addressed and optically addressed portions of said modulating unit are provided on a single substrate.

3. The spatial light modulator of claim 2, wherein said electrically addressed and optically addressed portions of said modulating unit are positioned side-by-side, with isolating means provided between said electrically addressed and optically addressed portions.

4. The spatial light modulator of claim 2, wherein said electrically addressed and optically addressed portions of said modulating unit are combined.

5. The spatial light modulator of claim 4, wherein each of said top and bottom conductive layers further comprises multiple concentric rings of varying diameters, each of said rings being isolated from adjacent rings.

6. The spatial light modulator of claim 1, wherein said quantum wells of said semiconductor multilayer structure have dark screening times and illuminated screening times, wherein said means for generating an electric potential further comprises means for applying a voltage and means for alternating a frequency of said applied voltage, and wherein said alternating means for said electrically addressed portion of said modulating unit switches said frequency of said voltage faster than said dark and illuminated screening times of said quantum wells.

7. The spatial light modulator of claim 1, wherein said semiconductor multilayer structure comprises layers of quantum wells alternating with barrier layers.

8. The spatial light modulator of claim 7, wherein said quantum well layers are selected from the group consisting of GaAs layers, GaSb layers, GaN layers, and InGaAs layers, and said barrier layers are selected from the group consisting of AlGaAs layers and AlGaSb layers.

9. The spatial light modulator of claim 1, wherein at least one of said conductive layers comprises a distributed Bragg reflector.

10. A joint transform correlator apparatus comprising:
    a first spatial light modulator having an electrically addressed portion for recording a first image and an optically addressed portion for recording a second image, the electrically addressed portion and the optically addressed portion being combined on a single substrate;
    transformation means for producing a correlation hologram of said first and second images;
    recording means for recording the correlation hologram; and
    correlation signal generating and measuring means for evaluating said correlation hologram.

11. The apparatus of claim 10, wherein said transformation means comprises an infrared light beam source for directing a first infrared beam onto said electrically addressed portion of said first spatial light modulator and a second infrared beam onto said optically addressed portion of said first light modulator, said first and second beams picking up said first and second images, respectively, from said spatial light modulator, and a lens for Fourier transforming said first and second beams carrying said first and second images.

12. The apparatus of claim 10, wherein said recording means is a second spatial light modulator.

13. The apparatus of claim 12, wherein said second spatial light modulator is an optically addressed spatial light modulator.

14. The apparatus of claim 10, wherein said recording means is said optically addressed portion of said first spatial light modulator, and wherein said transformation means comprises an infrared light beam source for directing a first infrared beam onto said electrically addressed portion of said first spatial light modulator and a second infrared beam onto said optically addressed portion of said first light modulator, said first and second beams picking up said first and second images, respectively, from said spatial light modulator, and a means for Fourier transforming said first and second beams carrying said first and second images in the plane of said optically addressed portion of said first spatial light modulator.

15. The apparatus of claim 14, wherein said Fourier transforming means is a parabolic reflector.

16. The apparatus of claim 10, wherein said correlation signal generating and measuring means further comprises means for reading said correlation hologram displayed on said recording means and for creating a correlation beam carrying a correlation image of said correlation hologram, and means for detecting said correlation beam and for processing said correlation image carried by said correlation beam.

17. The apparatus of claim 16, wherein said reading and creating means is a source of infrared light.

18. The apparatus of claim 16, wherein said detecting means is a photodiode array.

19. The apparatus of claim 10, further comprising means for producing said second image on said optically addressed portion of said spatial light modulator.

20. The apparatus of claim 19, wherein said first image producing means comprises a source of white light, said white light carrying said second image.

21. The apparatus of claim 10, wherein said first image is a reference image and said second image is an input image.

22. The apparatus of claim 10, wherein said recording means is a second spatial light modulator having an electrically addressed portion and an optically addressed portion.

23. The apparatus of claim 22, wherein said electrically addressed portion and said optically addressed portion of said second spatial light modulator are combined.

24. The apparatus of claim 23, wherein said second modulator has electrodes comprising multiple concentric rings spaced apart by isolating regions.

25. The apparatus of claim 10, wherein said electrically addressed portion and said optically addressed portion of said first spatial light modulator each has:
   a photodiffracting semiconductor multilayer structure, including a plurality of quantum wells;
   a top conductive layer that is at least partially transparent;
   a bottom conductive layer;
   said top conductive layer and said bottom conductive layer sandwiching said semiconductor multilayer structure;
   at least one cladding layer sandwiched between said semiconductor multilayer structure and said top conductive layer or said bottom conductive layer;
   said electrically addressed portion of said first spatial light modulator has a matrix of pixels provided therein; and
   means for generating an electric potential between said top conductive layer and said bottom conductive layer, thereby producing an electric field within said semiconductor multilayer structure.

26. The apparatus according to claim 10, wherein said electrically addressed portion and said optically addressed portion of said first spatial light modulator are provided on a single substrate.

27. A method of performing joint transform correlation, comprising the steps of:
   providing a first spatial light modulator having at least one optically addressed portion and at least one electrically addressed portion;
   recording a first image on said electrically addressed portion of said modulator;
   recording a second image on said optically addressed portion of said modulator;
   producing a correlation hologram of said first and second images;
   cropping sections of said correlation hologram;
   creating a correlation output image of said correlation hologram;
   converting the correlation image to a correlation signal; and
   processing said correlation signal to obtain a correlation for said first and second images.

28. The method of claim 27, wherein said optically addressed portion of said first spatial light modulator has broadband sensitivity to light.

29. The method of claim 27, wherein said electrically addressed and optically addressed portions of said first spatial light modulator have dark and illuminated screening times, and further comprising the steps of switching an applied field to said electrically addressed portion at a rate faster than said dark screening time and said illuminated screening time of said electrically addressed portion, and switching an applied field to said optically addressed portion at a rate slower than said illuminated screening time of said optically addressed portion.

30. The method of claim 27, wherein the step of recording said second image further comprises directing a writing beam carrying said second image onto said optically addressed portion of said modulator.

31. The method of claim 27, wherein the step of producing said correlation hologram of said first and second images comprises converting said first image to a first coherent image by directing a first beam onto said electrically addressed portion of said modulator, converting said second image to a second coherent image by directing a second beam onto said optically addressed portion of said modulator, and passing said first and second beams carrying said first and second coherent images, respectively, through a lens.

32. The method of claim 27, wherein said correlation hologram is transformed in the plane of said optically addressed portion of said first spatial light modulator, and wherein the step of producing said correlation hologram of said first and second images comprises converting said first image to a first coherent image by directing a first beam onto said electrically addressed portion of said modulator, converting said second image to a second coherent image by directing a second beam onto said optically addressed portion of said modulator, and passing said first and second beams carrying said first and second coherent images, respectively, to a parabolic reflector.

33. The method of claim 27, wherein the step of cropping sections of said correlation hologram comprises applying an applied field to only selected sections of said modulator.

34. The method of claim 27, wherein said electrically and optically addressed portions of said first spatial light modulator are combined and physically indistinct, and wherein the step of recording a second image on said optically addressed portions comprises applying an applied field to only selected sections of said portions.

* * * * *